INVENTOR.
MARCUS A. McCOY
BY
D. Gordon Angus
ATTORNEY

INVENTOR.
MARCUS A. McCOY
BY D. Gordon Angus
ATTORNEY

INVENTOR.
MARCUS A. McCOY
BY D. Gordon Angus
ATTORNEY

Patented Mar. 11, 1952 2,588,551

UNITED STATES PATENT OFFICE 2,588,551

FREQUENCY MODULATION

Marcus A. McCoy, Los Angeles, Calif., assignor to United Geophysical Company, Inc., Pasadena, Calif., a corporation of California Application February 21, 1949, Serial No. 77,513

15 Claims. (Cl. 332—29)

This invention relates to frequency modulation, and has for its principal object to provide a frequency modulation system which is relatively simple in its arrangement and operation, and which is capable of producing frequency swing of the carrier frequency which is proportional to the modulating voltage over a considerable range of frequency and intensity of the modulating voltage. A related object is to produce effective frequency modulation even at very low modulating frequencies, including D. C. and step wave modulating voltage.

It is a common practice to produce frequency modulation with the use of an oscillator by varying the oscillating frequency in accordance with variations of a controlling or modulating voltage. This has been done, for example, by varying the reactance of a tank circuit of an oscillator in accordance with the modulating source, so that the oscillator frequency is varied at a rate proportional to the modulating frequency and by an amount proportional to the amplitude of the modulating voltage. Such prior systems have had inherent complications and have been subject to the disadvantage that their central carrier frequency could not readily be stabilized, or they would not respond well at very low frequencies or at D. C. modulating or controlling voltages. For example, when frequency modulation has been produced by varying the reactance in the tank circuit of an oscillator, it has not been practical to use an oscillator of the most stabilized frequency type such as the crystal controlled oscillator, because it has not been practical to vary the frequency established by the crystal.

In accordance with the present invention, the disadvantages of the previously described frequency modulation systems are overcome by provision of a relatively simple system capable of a highly stabilized central carrier frequency and capable of modulation over a wide range of modulating voltage intensity and frequency, including even D. C. modulating voltage.

The invention is carried out by provision in a circuit of the oscillator, of an automatic switching arrangement for effectively switching a reactance element in and out of circuit with the oscillator, at the rate of the carrier frequency. For the automatic switching arrangement there is preferably used a pair of non-linear impedances or impedance paths, such as rectifiers, effectively in parallel with each other, and with their directions of forward conductivity opposed to each other. The pair of non-linear impedance paths is connected in series with the said reactance element so that the reactance element has some control of the frequency of the oscillator. The modulating voltage controls the time intervals during the oscillator voltage cycle when the non-linear impedance elements are effective to switch the reactance element into the oscillator circuit. Preferably the reactance element is a capacity.

By this novel system, the controlling effect of the modulating voltage is applied to the oscillator circuit through the two non-linear impedances, alternately, at and near the peaks of the oscillator voltage.

While the use of two non-linear impedances or impedance paths, correlated as indicated above, is preferred, frequency modulation could also be had by the use of a single non-linear element or path, with provision for a complete path for flow of the uni-directional current component developed at the non-linear impedance.

The oscillator is preferably of a fixed-frequency type, for example, a type controlled by a piezoelectric crystal, although it should be understood that other types of oscillators could be used if desired.

The foregoing and other features and advantages of my invention will be better understood from the following detailed description and the accompanying drawings of which:

Figure 1:
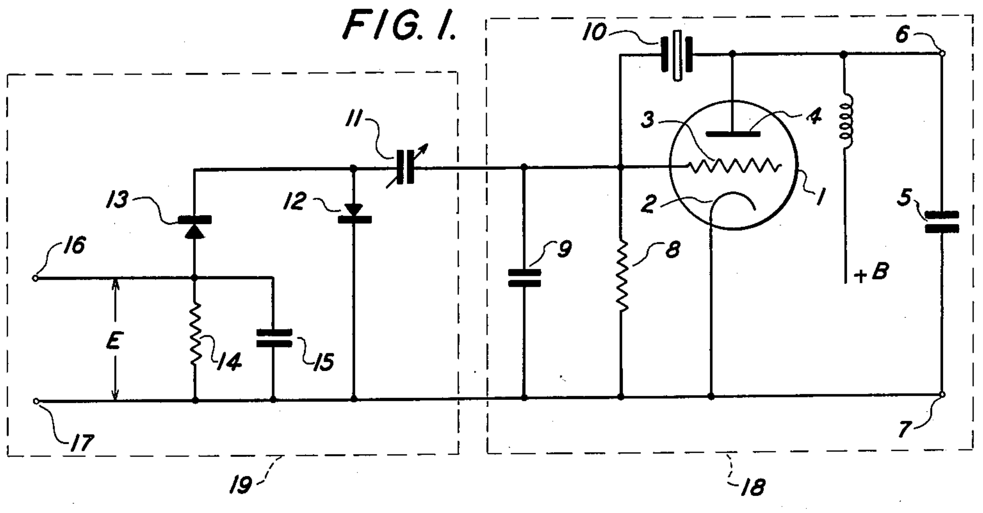
Fig. 1 is a schematic wiring diagram showing a frequency modulation system according to this invention.

Referring to Fig. 1, the carrier frequency oscillator comprises a vacuum tube 1 which is shown as the three-electrode type having a cathode 2, a control grid 3, and an anode 4; and a condenser 5 is connected between the cathode and anode; that is, between terminals 6 and 7 which constitute the output terminals of the oscillator. Between the cathode and the control grid, there are connected a resistor 8 and capacity 9, in parallel with each other; and the frequency of the oscillator is established by a piezo-electric crystal 10 and the loading of the modulating circuit connected across the reactance 9 between the cathode and control grid. Anode voltage is supplied in a conventional manner from a D. C. voltage source +B.

The oscillator thus far described is a known type having no frequency-determining tank circuit, but having its normal frequency established principally by the crystal 10.

Frequency modulation of the oscillations is produced by the addition of a reactance element, namely a condenser 11 which is preferably of the adjustable type, as indicated. The condenser is connected from the grid 3 in series with a rectifier 12; and the side of the rectifier remote from the condenser is connected with the cathode 2, so that the series-arranged condenser 11 and rectifier 12 are effectively between the grid and cathode of the oscillator and across the capacity 9 which comprises reactance in the grid-cathode circuit of the oscillator. Although the frequency of the oscillator is established primarily by the crystal 10, the oscillator frequency is subject to some variation from the crystal frequency by variation of the reactance in the grid-cathode circuit. In parallel with the rectifier 12 there is connected another arm comprising a rectifier 13 in series with a resistor 14 across which is connected a condenser 15. In operation, the resistor 14 has flowing through it a current from the modulation source of voltage connected across it at terminals 16 and 17, and also a current resulting from rectification of the impressed oscillator voltage. The elements 12, 13, 14 and 15 thus comprise a rectifier system across reactance in the grid-cathode circuit of the oscillator.

The rectifiers 12 and 13 are half-wave rectifiers and are preferably of the crystal type, such as germanium, having a non-linear conductivity characteristic with a high front to back resistance ratio, and a forward resistance that is very low compared to the reactance of condenser 11 at the oscillator frequency. The directions of forward conductivity of the rectifiers are opposite to each other with reference to current flowing from condenser 11. Thus during a portion of one-half cycle of the oscillator frequency, rectifier 12 is relatively conductive, and during a portion of the other one-half cycle of oscillator frequency rectifier 13 is relatively conductive.

Condenser 15 and resistor 14 comprise a load circuit for rectifiers 12 and 13. In actual operation in my system the oscillator section is operated at a sufficiently high voltage level so that there appears a rectified and filtered D. C. voltage across load circuit 14 and 15, which will usually equal some value between twice the R. M. S. value and twice the peak value of the oscillator voltage appearing across rectifier 12.

The voltage due to the charge accumulated on condensers 15 and 11 acts as a self-developed bias, which renders diodes 12 and 13 non-conductive during an appreciable part of the time. However, alternately during a portion of each one-half cycle, the instantaneous value of voltage supplied by the oscillator exceeds the self-developed bias, and renders one rectifier or the other conductive. During the conductive periods, the grid-cathode circuit of the oscilator is effectively loaded by the reactance of condenser 11. During non-conducting periods, condenser 11 is effectively disconnected from the oscillator circuit. The average repetition frequency of the oscillation is thus altered in accordance with the length of time during each cycle for which the rectifiers are conducting. The resulting wave form will be somewhat distorted from that of a pure sine wave.

If now a modulating voltage is impressed across 14 and 15 in addition to the self-developed bias described above, the duration of periods of rectifier conduction will be altered, and accordingly, the fraction of each cycle during which the oscillator is loaded by the reactance of condenser 11. Thus the frequency of the oscillator will change in response to changes in the applied modulating voltage. To a first approximation the frequency deviation will be proportional to the magnitude of applied modulating voltage. To a smaller extent the frequency deviation will also be a function of the rate of change of applied modulating voltage. This latter effect (which is generally most prominent for higher frequency components of the modulating voltage) can be largely compensated for by appropriate corrective filter networks placed in the input circuit through which the modulating voltage is applied.

In the arrangement of Fig. 1, the polarity of rectifiers 12 and 13 can be both reversed with respect to the polarities indicated in the figure; and the system will still be operative. The direction of forward conductivity of the two rectifiers should, however, be maintained opposite to each other relative to the voltage from the oscillator.

The elements shown within the dotted rectangle 18 represent the elements of the oscillator part of the system, while the elements within the other dotted rectangle 19 represent the elements of the modulating part of the system. It should be understood that some other form of oscillator than the particular form illustrated may be used; although the fullest advantage of the invention will generally be experienced when the oscillator is of the crystal-controlled, non-tank-circuit type of which an example is shown in Fig. 1.

Although a considerable choice of circuit elements is permissible in keeping with good design practice and also dependent largely on the frequencies used and the purpose of the system, the following set of approximate values has been found useful in designing the system of Fig. 1 for a central oscillation frequency of about 3870 kilocycles per second:

| | |
|---|---|
| Triode | A 7F8 tube |
| Capacity 5 | 100 mmf. |
| Resistor 8 | 60,000 ohms |
| Capacity 9 | 10 mmf. |
| Capacity 11 | 100 mmf. |
| Rectifiers 12 and 13 | Type 1N34 diodes |
| Resistor 14 | 15,000 ohms |
| Capacity 15 | .005 mf. |

In practice, resistor 14 will usually be adjusted somewhat to set up a good linear operation, as will be more fully indicated hereinafter.

Figure 2:
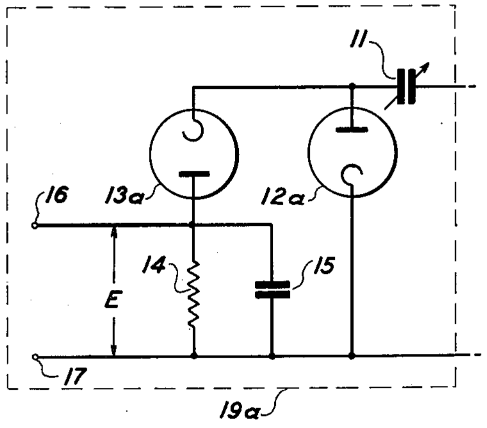
Fig. 2 shows a modulation portion of a system which may be substituted for the modulation portion in Fig. 1.

The modulation portion of the system may be varied somewhat, within the scope of the invention. Although germanium-type rectifiers are generally preferred, the circuits of the present invention are not necessarily limited to germanium rectifiers. Some other type of non-linear circuit element may be employed in lieu of elements 12 and 13, in the various uses to which the system is applicable. For example, the non-linear elements may be vacuum diode, triode or multi-element tubes, gaseous diode, triode or multi-element tubes, thermistors, or varistors. In some high voltage applications, it may be possible to employ spark gaps and in some small frequency applications, it may be possible to employ vibrator contacts controlled by the oscillation frequency. An example of a variation in the arrangement of Fig. 1 is shown in Fig. 2 which shows a modulation portion within the dotted rectangle 19*a* which may be substituted for the elements within the rectangle 19 of Fig. 1. The principal difference of Fig. 2 from Fig. 1 lies in the substitution of vacuum tube diode type rectifiers 12*a* and 13*a* respectively, in place of the rectifiers 12 and 13 of Fig. 1.

Figure 3:
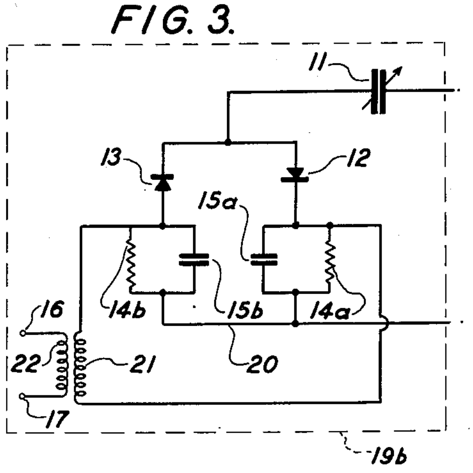
Fig. 3 shows a balanced form of modulation portion which may be substituted for the modulation portion shown in Fig. 1.

The invention is not limited to use of the particular modulation arrangement shown in Figs. 1 and 2, but instead, other forms of modulation portions may be used if desired. Fig. 3, for example, shows a modulation portion within dotted rectangle 19*b* which may be used in place of the elements within rectangle 19 of Fig. 1. A difference between the system of Fig. 3 and the corresponding portions of Figs. 1 and 2 resides in the use of a balanced circuit in Fig. 3. Instead of the single resistor 14 of Fig. 2, there is provided in the arrangement of Fig. 3 a pair of equal resistors 14*a* and 14*b*, connected respectively in series with rectifiers 12 and 13. Across the respective resistors 14*a* and 14*b* there are connected equal condensers 15*a* and 15*b*, these corresponding to the condenser 15 of Fig. 2. The lower ends of resistors 14*a* and 14*b* are tied together by a connector 20; and their upper ends are connected to the opposite sides of the secondary winding 21 of a transformer whose primary winding 22 is connected across the terminals 16 and 17.

Figure 4:
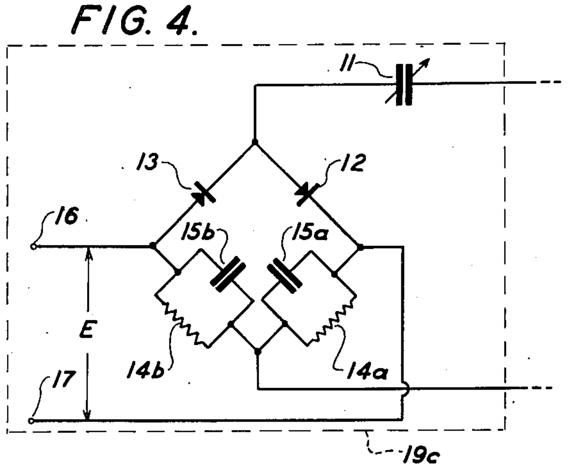
Fig. 4 illustrates a bridge type of modulation portion which may be used instead of that in Fig. 1.

The circuit of Fig. 3 is essentially a bridge circuit adapted for use with A. C. modulating voltage at terminals 16, 17. A more general form of the arrangement of Fig. 3 is shown in Fig. 4 which would allow the use of either D. C. or A. C. modulating voltage.

The balanced circuit arrangements of Figs. 3 and 4 operate in a manner similar to that just explained for Figs. 1 and 2. The principal difference is that in Figs. 3 and 4, rectifiers 12 and 13 are rendered conductive alternately through condensers 15*a* and 15*b*. This places condenser 11 intermittently across condenser 9, alternately through the two rectifiers. As in Figs. 1 and 2, the condensers 15*a* and 15*b* are of negligible reactance at the oscillator frequency as compared with the reactance of condenser 11.

Figure 5:
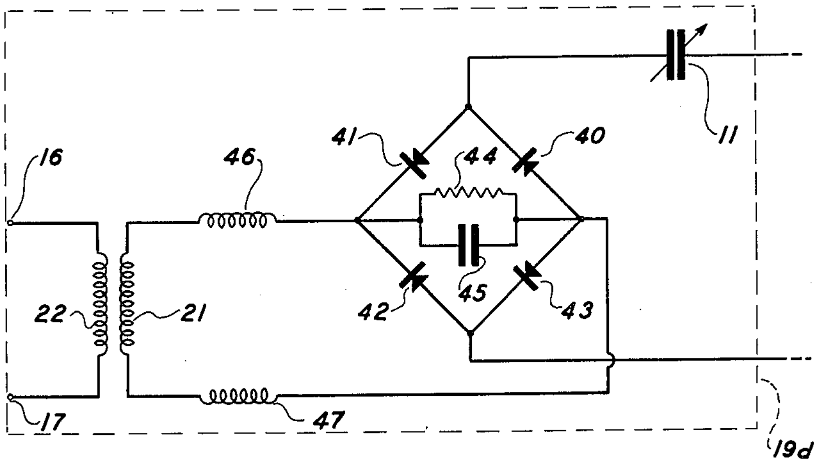
Fig. 5 shows another bridge type of modulation portion which may be used instead of that of Fig. 1.

Fig. 5 illustrates a modified arrangement of the bridge form in which non-linear impedances or rectifiers are placed in all four bridge arms, these rectifiers being numbered 40, 41, 42 and 43, respectively. In this arrangement, the load resistance 44 corresponding to resistance 14 of Fig. 1 is placed across two opposite bridge terminals; and the condenser 45 by-passes the high frequency component in the same manner as explained in connection with condenser 15. Preferably, chokes 46 and 47 are placed in the leads between the terminals of the transformer secondary winding 21 and the resistance 44.

In the operation of Fig. 5, the action of the non-linear impedances is the same as has been previously explained excepting that the alternate conductance of the elements occurs in opposite pairs. That is to say, during one time interval elements 41 and 43 are conductive with current flow through resistor 44; and during a succeeding time interval the opposite elements 40 and 42 are conductive with the current flow through resistor 44 in the same direction. Thus, condenser 11 is in effect placed intermittently across condenser 9 alternately through the two opposite pairs of rectifiers.

Figure 6:
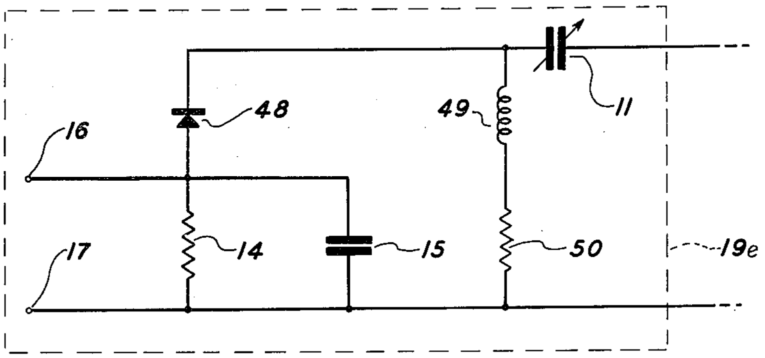
Fig. 6 shows a form of modulation portion containing only a single non-linear impedance path which may be used in place of the modulation portion of Fig. 1.

The several embodiments thus far described have been in the preferred form in which the reactance element 11 is placed across the reactance (condenser 9) of the oscillator circuit alternately through two paths each comprising a non-linear impedance. It is possible, however, to connect the condenser 11 across the reactance of the oscillator circuit through a single path containing the non-linear impedance. Such an arrangement is illustrated in Fig. 6 wherein a single rectifier or non-linear impedance element 48 is used in place of the two non-linear impedances 12 and 13 of Fig. 1, or of the non-linear impedances in the other preceding figures. To provide a complete path for the unidirectional current developed at the non-linear impedance 48, there is provided an inductance 49 connected between the upper side of the rectifier 48 and the lower side of the resistance 14 so that there is a direct current path through elements 48, 49 and 14. Preferably a resistance 50 is also connected in series with inductance 49 to provide some damping and thus prevent any undesirable resonance effects which may develop due to the inductance.

In the operation of Fig. 6, rectification occurs only at intervals within alternate half cycles of the oscillator; otherwise the operation is similar to that described in connection with the preceding figures.

Figure 7:
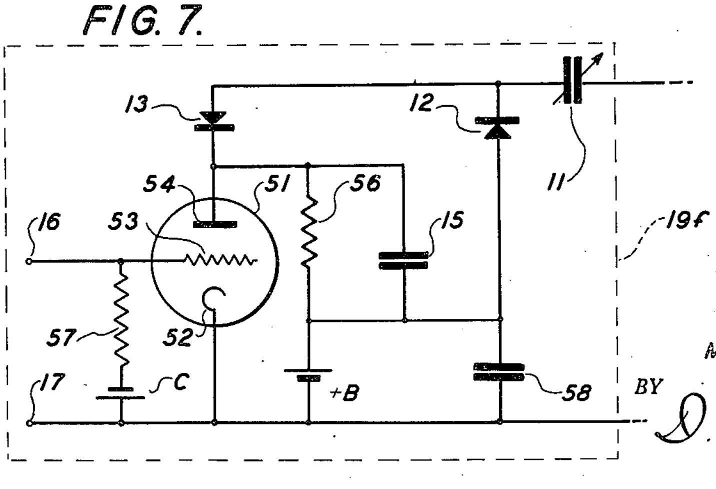
Fig. 7 shows a modulation portion using a vacuum tube which may be used in place of the modulation portion of Fig. 1.

A variation of the arrangement shown in Figs. 1 and 2 is illustrated in Fig. 7 which is particularly applicable for use with a high impedance modulating voltage source. In this arrangement, instead of using a resistor such as 14 in Fig. 1 there is used a vacuum tube 51 in the form of a triode having a cathode 52, a control grid 53 and an anode 54. If desired, anode operating voltage can be supplied through some suitable voltage source such as B through a resistance 56 together with an isolating condenser 58; however, it may not always be necessary to use this B voltage, as the charge accumulated on condenser 15 from the rectification may furnish suitable anode voltage for the tube. In the latter case, resistance 56 and voltage B may be omitted and the condenser shorted out. Suitable grid bias can be supplied from a source C through a grid leak resistor 57. In this arrangement, the impedance across terminals 16, 17 can be made high and changes in modulation voltage will have the effect of changing the cathode-anode resistance of the tube to effect the modulation. In the arrangement of Fig. 7, the direction of forward conductivity of the rectifier 13 should be placed to be the same as the direction of conductivity between the anode and cathode of tube 51.

Figure 8:
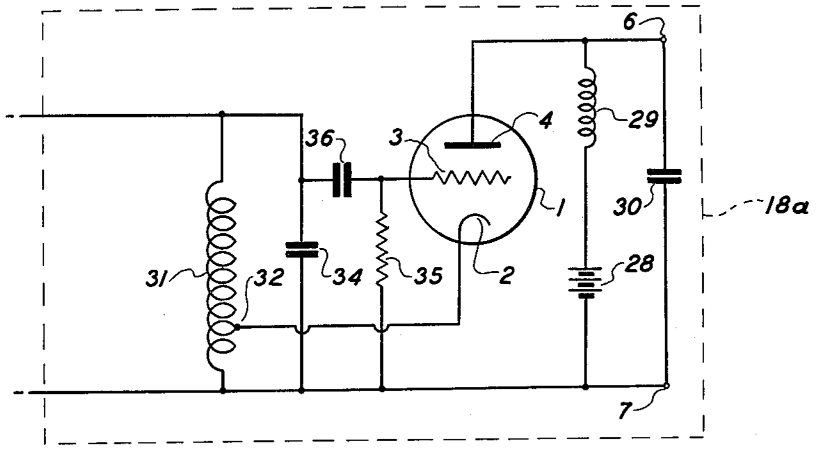
Fig. 8 illustrates a form of oscillator system which may be used instead of that shown in Fig. 1.

The invention is not limited to crystal controlled type oscillators such as is illustrated in Fig. 1, but is also useful in connection with other types of oscillators such as the feedback type. Fig. 8, for example, illustrates a well known feedback form of oscillator, shown within the dotted rectangle 18*a*, which may be used instead of that shown within rectangle 18 in Fig. 1. This comprises the triode tube 1 having electrodes 2, 3 and 4, the anode voltage being supplied from a D. C. voltage source 28 in series with a choke 29. The oscillatory system comprises a condenser 30 from the anode in series with an inductance 31 connected from the anode back to the grid, in series with a condenser 36. A tap 32 of the inductance is connected to the cathode so that part of the inductance is in the anode-cathode circuit and the other part is in the grid-cathode circuit with mutual inductance between the two portions to provide the feedback. The inductance is tuned by a condenser 34 connected across it; and in accordance with good practice, a resistor 35 is connected from the grid to the point between condenser 30 and inductance 31.

It is well known how to design an oscillator such as that of Fig. 8. The following values are given as an example of a particular design of oscillator adjusted for an oscillation frequency of about 2490 kilocycles per second when loaded with the modulation circuit.

| | |
|---|---|
| Vacuum tube | A 7F8 tube (half section only) |
| Capacity 30 | .004 mf. |
| Inductance 31 | .025 millihenry |
| Capacity 34 | 89 mmf. |
| Capacity 36 | 100 mmf. |
| Resistor 35 | 60,000 ohms |

It is not at the present time entirely clear in every detail just how this system produces its frequency modulation effect. The instantaneous relationships between currents and voltages in various parts of the circuit are quite complicated in nature, and are difficult to predict by theoretical analysis alone. Suffice it to say, the system has been thoroughly tested and it has been found that it frequency modulates the oscillations with good fidelity, over a wide range of modulating frequency and amplitude. Although a complete or positive theory of all the conditions which occur in the system during operation are not positively known, its operation is believed to be somewhat in accordance with the following explanation, although it is not wished to be bound by this theory.

Figure 9:
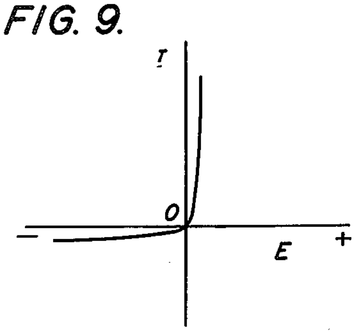
Fig. 9 illustrates a characteristic curve of the non-linear impedances which may be used in the circuits of this invention.

Crystal rectifiers such as germanium type used as the rectifiers 12 and 13 in Fig. 1 have a voltage-current characteristic in the form shown in Fig. 9, and dry plate rectifiers are similar; that is, when the voltage is in the reverse direction of the rectifier, a very small back current flows in the reverse direction as indicated at the negative voltage side of the graph; but when the voltage increases in the forward direction, the current rapidly increases as shown at the positive side of the graph. Accordingly, during those intervals in the cycles of the oscillator when the instantaneous voltages across recitfier 12 are in its forward direction, its resistance is very low, and condenser 11 is effectively connected across condenser 9. During the remaining parts of the cycles, however, the resistance of rectifier 12 becomes very high and substantially prevents current flow through it. During these latter parts of the cycles, there occur the intervals during which rectifier 13 is relatively conductive so as to place condenser 11 effectively in series with rectifier 13 and condenser 15. The net effect of these alternate intermittent connections of condenser 11 first across condenser 9 through rectifier 12 and then across condenser 9 through the other rectifier 13 is apparently to produce a distortion in the oscillator wave form which alters the width of each oscillation cycle according to the portion of the cycle during which condenser 11 is connected across condenser 9. Inasmuch as the value of modulating voltage determines the portion of the oscillator cycle during which condenser 11 is connected, the value of modulating voltage determines the net width of each oscillation cycle and thus the frequency of oscillation.

Figure 10:
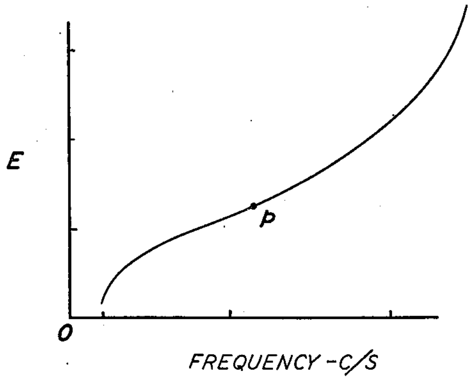
Fig. 10 shows a frequency modulation characteristic produced by the invention.

The frequency variation characteristic due to this action is represented by Fig. 10 which shows how the oscillator frequency varies in accordance with variation of an applied voltage E across the resistor 14, an increased voltage E increasing the oscillator frequency, and a decreased voltage E decreasing the oscillator frequency. This applied voltage E may be either a D. C. voltage due to a battery or the like or it may represent instantaneous values of A. C. voltage connected across terminals 16 and 17.

Ordinarily it will be desirable to adjust the central frequency of the oscillator, when no modulation voltage is present, to lie at the middle of the linear part of the curve of Fig. 10. This is indicated by the point *p* in the figure. The adjustment can be made by adjustment of the value of the load resistance, namely 14, or 14*a* and 14*b*, or 44, or the vacuum tube of Fig. 7. Alternately, an adjustable D. C. voltage or battery in series with the load resistor and rectifiers could be used for the adjustment. Or again, some other expedient, such as a connective network, might be used to establish the center point.

Regardless of the particular theory or manner in which the frequency modulation is produced, the invention has been demonstrated to have marked advantages over previously known forms of frequency modulation systems. An outstanding advantage is the simplicity of the circuit arrangement and avoidance of many of the filament and anode voltage supply sources heretofore used with the reactance tubes of such systems. A further important advantage is the frequency stability of the carrier frequency which can be obtained for the oscillator of the system. A further very important advantage resides in the wide range of frequency modulation of the oscillator, together with good linearity, that is, proportionality of frequency variation with amplitude of modulation voltage.

I claim:

1. A frequency modulation system comprising an oscillator having a circuit containing a reactance, the variation of which varies the frequency of the oscillator, a modulating system connected across said reactance, said modulating system comprising a reactance element in series with two parallel paths each of which contains a non-linear impedance, and one of the paths containing a resistance across which a bias voltage is developed from the oscillator, a source of modulating voltage across said resistance, the direction of forward conductivity of the two non-linear impedances being opposed to each other with reference to said oscillator circuit.

2. A frequency modulation system according to claim 1 in which the non-linear impedances are rectifiers.

3. A frequency modulation system according to claim 1 in which the non-linear impedances are crystal rectifiers.

4. A frequency modulation system according to claim 1 in which the non-linear impedances are diode rectifiers.

5. A frequency modulation system according to claim 1 in which the reactance element is a condenser.

6. A frequency modulation system comprising an oscillator of the crystal-controlled type and having a circuit containing a reactance the variation of which varies the frequency of the oscillator, a modulating system connected across said reactance, said modulating system comprising a reactance element in series with two parallel paths, each of said paths containing a rectifier presenting a much lower impedance in one direction than in the other direction, and the direction of lower impedance of the two rectifiers being opposed to each other with reference to the reactance element, a parallel arranged capacity and resistance in series with one of said rectifiers in one of said paths whereby a bias voltage is developed from the oscillator across said resistance, and means for connecting a source of modulating voltage across said resistance.

7. A frequency modulation system comprising an oscillator having a tuned circuit containing reactance the variation of which varies the frequency of the oscillator, a modulating system connected across at least part of said tuned circuit, said modulating system comprising a reactance element in series with two parallel paths, each of said paths containing a non-linear impedance, a substantially non-reactive load resistance in parallel with a condenser, said parallel arranged condenser and resistance being in series with the non-linear impedance in one of said paths whereby a bias voltage is developed from the oscillator across said load resistance, and a source of modulating voltage across said load resistance, the direction of forward conductivity of the two non-linear impedances being opposed to each other with reference to the reactance element, whereby the reactance element is effectively connected across said tuned circuit part alternately through the two non-linear impedances and at the frequency of said oscillator.

8. A frequency modulation system comprising an oscillator having a circuit containing a reactance the variation of which varies the frequency of the oscillator, a modulating system connected across at least a portion of said circuit, said modulating system comprising a reactance element in series with two parallel paths each of which contains a rectifier the directions of conductivity of which are opposed to each other with reference to said oscillator circuit, one of said paths containing in series with its rectifier the parallel arrangement of a resistance and a condenser, and a source of modulating voltage connected across the resistance.

9. A frequency modulation system comprising an oscillator having a circuit the variation of whose reactance varies the frequency of the oscillator, a modulating system connected across said circuit, said modulating system comprising a reactance element in series with two parallel paths, each of said paths containing a rectifier presenting a much lower impedance in one direction than in the other direction and the direction of lower impedance of the two rectifiers being opposed to each other with reference to the reactance element, an impedance in series with each rectifier and at the side thereof remote from said reactance element, the sides of said impedances remote from the rctifiers being connected together and to the oscillator circuit, and a source of modulating voltage connected between the junction which one rectifier makes with the impedance in series therewith and the junction which the other rectifier makes with the impedance in series therewith.

10. A system according to claim 9 in which the impedances in series with the two rectifiers are of equal value.

11. A system according to claim 9 in which each impedance in series with its associated rectifier comprises a resistance in parallel with a condenser which is of negligibly small reactance at the oscillator frequency.

12. A system according to claim 9 in which the two rectifiers and the two impedances are arranged in a bridge circuit, one pair of opposite terminals of which are connected in series through the reactance element and across the oscillator circuit, and the conjugate pair of opposite terminals of which are adapted for connection to the source of modulating voltage.

13. A frequency modulation system comprising an oscillator whose frequency is variable with change of reactance across a circuit thereof, a rectifier system comprising a non-linear impedance in series with a substantially non-reactive resistive load which is shunted by a condenser, said rectifier system being connected across said reactance, said non-linear impedance developing a unidirectional bias voltage across said load in response to the voltage from the oscillator, and a source of modulation voltage connected across said resistive load.

14. A frequency modulation system comprising an oscillator whose frequency is variable with change of reactance across a circuit thereof, a rectifier system comprising a non-linear impedance in series with a substantially non-reactive resistive load which is shunted by a condenser, a reactance element in series with said rectifier system, the series arranged reactance element and rectifier system being connected across the reactance, said non-linear impedance developing a unidirectional bias voltage due to the oscillator voltage across the non-linear impedance, and a source of modulation voltage connected across said resistive load.

15. A frequency modulation system comprising an oscillator having a circuit, the variation of whose reactance varies the frequency of the oscillator, a reactance element connected across said circuit, said reactance element being connected in series with two opposite terminals of a bridge, said bridge having four arms witih a non-linear impedance in each arm, and a load resistance connected across the two opposite terminals of the bridge, the direction of conductivity of the non-linear impedances in the opposite bridge arms being the same, and a source of modulating voltage connected across said load impedance.

MARCUS A. McCOY.

REFERENCES CITED

The following references are of record in the file of this patent:

UNITED STATES PATENTS

| Number | Name | Date |
|---|---|---|
| 2,077,223 | Crosby | Apr. 13, 1937 |
| 2,374,000 | Crosby | Apr. 17, 1945 |
| 2,461,307 | Antalek | Feb. 8, 1949 |
| 2,469,837 | Mohr | May 10, 1949 |
| 2,559,023 | McCoy | July 3, 1951 |

FOREIGN PATENTS

| Number | Country | Date |
|---|---|---|
| 561,322 | Great Britain | May 15, 1944 |